US008868088B2

(12) United States Patent
Cheng et al.

(10) Patent No.: US 8,868,088 B2
(45) Date of Patent: Oct. 21, 2014

(54) METHOD AND APPARATUS FOR COMMUNICATION CONTROL BETWEEN RADIO NETWORK CONTROLLERS

(75) Inventors: Xiang Cheng, Guangdong (CN); Yu Zhang, Guangdong (CN); Meifang He, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 335 days.

(21) Appl. No.: 13/257,872
(22) PCT Filed: Jan. 19, 2010
(86) PCT No.: PCT/CN2010/070255
§ 371 (c)(1),
(2), (4) Date: Oct. 21, 2011
(87) PCT Pub. No.: WO2011/020310
PCT Pub. Date: Feb. 24, 2011

(65) Prior Publication Data
US 2012/0135762 A1    May 31, 2012

(30) Foreign Application Priority Data
Aug. 18, 2009    (CN) .......................... 2009 1 0168543

(51) Int. Cl.
*H04W 72/00* (2009.01)
*H04W 36/00* (2009.01)
*H04W 92/22* (2009.01)

(52) U.S. Cl.
CPC .......... *H04W 36/0055* (2013.01); *H04W 92/22* (2013.01)
USPC ...................... 455/450; 455/435.1; 455/452.1

(58) Field of Classification Search
CPC ............ H04W 72/04; H04W 72/0406; H04W 72/0426; H04W 72/0433; H04W 92/16; H04W 92/22; H04W 92/24
USPC .............................................. 455/435.1, 450
See application file for complete search history.

(56) References Cited

U.S. PATENT DOCUMENTS

2005/0207374 A1*  9/2005  Petrovic et al. ................ 370/331
2005/0249160 A1*  11/2005  Tomita et al. ................. 370/329
(Continued)

FOREIGN PATENT DOCUMENTS

CN    1585505 A    2/2005
CN    1832614 A    9/2006
(Continued)

OTHER PUBLICATIONS

Technical Specification Group, Radio Access Network TSGR#4(99)342, UMTS 25.423 UTRAN Iur Interface RNSAP Signalling v1.1.1, Miami, USA, Jun. 17-18, 1999, 3GPP, pp. 1-52.*

(Continued)

*Primary Examiner* — Mazda Sabouri
(74) *Attorney, Agent, or Firm* — Ling Wu; Stephen Yang; Ling and Yang Intellectual Property

(57) ABSTRACT

The present invention provides a method for communication control between radio network controllers. The method comprises: after a serving node B belonging to a drift radio network controller controls a terminal to perform activation of an enhanced dedicated channel radio link, notifying a radio link activation information of the terminal to the drift radio network controller; and the drift radio network controller sending a radio link activation indication to a serving radio network controller according to the radio link activation information; and, after the serving node B belonging to the drift radio network controller controls the terminal to perform deactivation of the enhanced dedicated channel radio link, notifying a radio link deactivation information of the terminal to the drift radio network controller; and the drift radio network controller sending a radio link deactivation indication to the serving radio network controller according to the radio link deactivation information.

11 Claims, 4 Drawing Sheets

(56) References Cited

U.S. PATENT DOCUMENTS

2006/0039296 A1* 2/2006 Nakamata et al. ............ 370/252
2006/0154627 A1* 7/2006 Wang et al. .................. 455/130

FOREIGN PATENT DOCUMENTS

CN 101146118 A 3/2008
EP 1968253 A1 9/2008

OTHER PUBLICATIONS

International Search Report for PCT/CN2010/070255 dated Apr. 30, 2010.
"Enhanced uplink"; 3rd Generation Partnership Project; Technical Specification Group Radio Access Network; Overall description; Stage 2; Release 9; 3GPP TS 25.319 V9.0.0; Jun. 2009; XP50367639A; see pp. 1-70.
"UTRAN Iur interface user plane protocols for Common Transport Channel data streams"; 3rd Generation Partnership Project; Technical Specification Group Radio Access Network; Release 8; 3GPP TS 25.425 V8.2.0; Mar. 2009; XP50368642A; see pp. 1-48.
"NBAP/RNSAP for deactivation or activation of secondary carrier in non serving Node B"; Ericsson, R3, RANimp-DC_HSUPA; 3GPP TSG-RAN3 Meeting #65bis, Miyazaki, Japan, Oct. 12-15, 2009; R3-092474; XP50391982A.
"Handling of RL-level Parameters for HSDPA"; rb 5.0.2, LG Electronics Inc., Discussion and Decision; TSG-RAN Working Group 3 Meeting #30 Sophia Antipolis, France, Jun. 24-28, 2002; R3-021746; XP50153346A; see pp. 1-4.

* cited by examiner

METHOD AND APPARATUS FOR COMMUNICATION CONTROL BETWEEN RADIO NETWORK CONTROLLERS

TECHNICAL FIELD

The present invention relates to the field of radio communication, and more particularly, to a method and apparatus for communication control between radio network controllers.

BACKGROUND OF THE RELATED ART

In radio communication system, a radio link is a logic connection between one terminal and one access point in a radio access system, and it physically consists of one or more radio bearer transmissions. There is at most one radio link between the terminal and one access point (typically referring to a cell) in the radio access system. A radio link identification is used to identify the radio link, and each radio link related to the terminal has a unique radio link identification.

An interconnection of type B (IUB for short) interface is a logic interface between a radio network controller (RNC) and a node B. An IUB interface protocol framework consists of two function layers: a radio network layer and a transport network layer. Node B application part (NBAP) is a part in the radio network layer, and it accurately and completely specifies the functional behavior of the node B. The NBAP basic process can be divided into a public process and a dedicated process that respectively correspond to a public link signaling process and a dedicated link signaling process. The public process is applied to signaling that is already in the node B but has no relationship with the specific terminal or a specific terminal context initialization request process, including: establishing a first radio link of the terminal and selecting a service termination port. The dedicated process is a process of associating with a specific terminal context; after the RNC allocates the service termination port to the terminal through the public process, each subsequent signaling related to the terminal interacts with each other by using the dedicated process via a dedicated control port of the node, including: adding, releasing and reconfiguring a radio link for a specific terminal.

An interconnection of RNC (IUR for short) interface is an interface used by the RNC to interact signaling and data with other RNCs, and it is an interconnection bond between radio network subsystems. With the IUR interfaces, different radio network subsystems can be connected together, and mobility management of the terminal connected with the RNC crossing the radio network subsystems can be fulfilled by a dedicated protocol—radio network subsystem application part (RNSAP), including the functions such as handoff between the radio network subsystems, radio resource processing and synchronization, and so on.

When a terminal establishes a connection to a radio access network and soft handoff is happened at the IUR interface, resource of more than one RNC will be used, and different RNCs play different roles at the time:

serving RNC: the serving RNC refers to a RNC keeping the terminal connecting with an interface of a core network. The serving RNC is responsible for data transport between the core network and the terminal, and for forwarding and receiving interface signaling with the core network; for performing radio resource control and layer 2 processing to data at an air interface; and also for executing a basic radio resource management operation, such as handoff judgment, outer-loop power control and conversion from parameters of radio access bearer to transport channel parameters of the air interface.

drift RNC: the drift RNCs refer to all other RNCs except the serving RNC. The drift RNC controls the cell used by the terminal, and if desired, the drift RNC can perform macro diversity merger. Unless the terminal uses a public transport channel, the drift RNC can not perform layer 2 processing to the data at the terminal plane, while only transfers the data at the air interface transparently to the serving RNC via the routing of the IUR interface. One terminal might have more than one drift RNC.

The IUR interface has the following three main functions: management of the basic mobility between the RNCs, and service flows for supporting the public channel and for supporting the dedicated channel. These service flows are the most basic functions of the IUR interface, and RNCs from different manufactures have to fulfill compatibility of these service flows, otherwise, the interconnection of the IUR interfaces is meaningless.

The terminal context is a basic concept to which each main function of the IUR interface relates. The terminal context contains the information needed for communicating between the drift RNC/drift node B and a certain specific terminal. The terminal context is created in a radio link establishment process or an uplink signaling transport process which occurs when the terminal initially accesses to a cell controlled by the drift RNC/drift node B. The terminal context is deleted when there is no radio link or public transport channel established for the terminal due to a radio link deletion process, a public transport channel resource release process or a downlink signaling transport process related to this terminal.

A connection frame number (CFN) provides a public frame reference used by the layer 2 between a universal mobile telecommunication system terrestrial radio access network (including the node B and the RNCs) and a terminal. Essentially, the CFN is a counter of frames used to synchronize the transport channel of layer 2 between the universal mobile telecommunication system terrestrial radio access network (including the node B and the RNCs) and the terminal. For a block of transport data, the receiving end and transmitting end of the air interface have the same CFN. However, the CFN is not transmitted at the air interface. A system frame number (SFN) of each cell is transmitted on a broadcasting channel of the cell, thus with a mapping relationship between the CFNs and the SFNs, the SFN at the two ends of the air interface can be kept consistent. The value range of the CFN is from 0 to 255, with a cycle of 256 frames for recycling. In the existing radio access technology, a length of one frame is 10 ms.

In the existing systems, the purpose of a high speed uplink packet access (HSUPA) technology is to improve capacity and data throughput in an uplink direction, and reduce the delay in a dedicated channel. The HSUPA technology introduces a new transmission channel, i.e., an enhanced dedicated channel, with improving the implementation of a physical layer and a media access control layer, so as to achieve a maximum theoretical uplink data rate of 5.6 megabits per second. The HSUPA technology retains the characteristics of the soft handoff. For a terminal, there is an active set of the enhanced dedicated channel. In the active set of the enhanced dedicated channel, the cell in which the terminal receives absolute grant scheduling from the node B (which may belong to the serving radio network controller or the drift radio network controller) is called a serving enhanced dedicated channel cell, and the corresponding radio link (which is a radio link in the cell) is called a serving enhanced dedicated channel radio link identifying with the radio link identification. In the active set of the enhanced dedicated channel, a cell set, which at least includes the serving enhanced dedicated channel cell, of the same relative grant which can be accepted and merged by the terminal is called a serving enhanced dedicated channel cell set, and the corresponding radio link set (which is a set of radio links in each cell) is called a serving enhanced dedicated channel radio link set identifying with a radio link set identification. In the active set of the enhanced dedicated channel, the cell not belonging to the serving enhanced dedicated channel cell set is called non-serving enhanced dedicated channel cell, and the corresponding radio link (which is a radio link in the cell) is called non-serving enhanced dedicated channel radio link identifying with a radio link identification.

With development of the technology, a dual-carrier high speed uplink packet access technology (which allows the terminal to transmit data with the high speed uplink packet access technology over two carriers, so that the uplink data rate can be doubled) is desired to be introduced into the existing system. Moreover, the dual-carrier high speed uplink packet access technology can be used bonding with the existing dual-carrier high speed downlink packet access technology, and both of the technologies together are referred to as a dual-carrier technology. The expected scenarios of the dual-carrier technology are: a single-carrier high speed uplink packet access technology in an uplink direction and a single-carrier high speed downlink packet access technology in a downlink direction; a single-carrier high speed uplink packet access technology in an uplink direction and a dual-carrier high speed downlink packet access technology in a downlink direction; a dual-carrier high speed uplink packet access technology in an uplink direction and a dual-carrier high speed downlink packet access technology in a downlink direction. A carrier containing a high speed dedicated physical control channel in the dual-carrier technology is called an auxiliary carrier, and the other carrier remained in the dual-carrier is called a auxiliary carrier. For a terminal, each layer of the carrier in the dual-carrier has its own independent active set of the enhanced dedicated channel. At the frequency of the layer of the auxiliary carrier, in the active set of the enhanced dedicated channel of the auxiliary carrier, the Node B to which the serving enhanced dedicated channel radio link of the auxiliary carrier belongs is called a serving node B, other nodes B are called non-serving nodes B. Wherein: the serving node B might belong to a serving radio network controller or a drift radio network controller.

The serving node B controls the activation and deactivation of the enhanced dedicated channel radio link of the terminal (the enhanced dedicated channel radio link here can be the serving enhanced dedicated channel radio link managed by the serving node B or the non-serving enhanced dedicated channel radio link), and the serving radio network controller is responsible for coordinating the activation and deactivation of the non-serving enhanced dedicated channel radio link of the terminal by the non-serving node B. This control process is shown in FIG. 1, and when the serving node B belongs to the serving radio network controller and the non-serving node B belongs to the drift radio network controller, each control step is described as follows:

A: The serving node B controls the terminal to perform activation or deactivation of the enhanced dedicated channel radio link via the air interface, and the terminal confirms receiving a command of activation or deactivation of the radio link of the serving node B. The terminal executes the command of activation or deactivation of the radio link.

B: The serving node B notifies activation or deactivation information of the radio link of the terminal to the serving radio network controller via the IUB interface.

C: The serving radio network controller is responsible for coordinating activation and deactivation of the non-serving enhanced dedicated channel radio link of the terminal by the non-serving node B. The serving radio network controller sends a control command to the drift radio network controller to which the non-serving node B belongs via the IUR Interface, to command activation or deactivation of the non-serving radio link.

D: The drift radio network controller notifies the non-serving node B belonging to it to process the command of activation or deactivation of the non-serving enhanced dedicated channel radio link of the terminal.

However, the control process is not taken into account in the prior art when the serving node B belongs to the draft radio network controller rather than a serving radio network controller. As shown in FIG. 2, the serving node B belongs to the drift radio network controller, and each step in the control process is described as follows:

AA: The serving node B controls the terminal to perform activation or deactivation of the enhanced dedicated channel radio link via the air interface, and the terminal confirms receiving the command of activation or deactivation of the radio link of the serving node B. The terminal executes the command of activation or deactivation of the radio link.

BB: The serving node B notifies activation or deactivation information of the radio link of the terminal to the drift radio network controller via the IUB interface.

Due to no routing, the serving node B cannot directly report to the serving radio network controller, but can only report to the drift radio network controller via the IUB interface, as described in the above-mentioned step BB. However, the serving radio network controller can not acquire whether the above terminal performs the activation or deactivation of the enhanced dedicated channel radio link, so that the serving radio network controller cannot coordinate the activation and deactivation of the non-serving enhanced dedicated channel radio link of the terminal by the non-serving node B.

Thus, when in a scenario the serving node B does not belong to the serving radio network controller while belongs to the draft radio network controller, it results in that the non-serving enhanced dedicated channel radio link in the non-serving node B of the terminal cannot be activated or deactivated, thereby resulting in that the dual-carrier technology is not available in this scenario.

CONTENT OF THE INVENTION

The present invention provides a method and apparatus for communication control between radio network controllers to address the problem that the non-serving enhanced dedicated channel radio link under the non-serving node B of the terminal cannot be activated or deactivated in a scenario when the serving node B belongs to the drift radio network controller rather than the serving radio network controller.

In order to solve the above-mentioned technical problem, the present invention provides a method for communication control between radio network controllers, and the method comprises:

after a serving node B belonging to a drift radio network controller controls a terminal to perform activation of an enhanced dedicated channel radio link, notifying a radio link activation information of the terminal to the drift radio network controller; and the drift radio network controller sending a radio link activation indication to a serving radio network controller according to the radio link activation information; and after the serving node B belonging to the drift radio network controller controls the terminal to perform deactivation of the enhanced dedicated channel radio link, notifying a radio link deactivation information of the terminal to the drift radio network controller; and the drift radio network controller sending a radio link deactivation indication to the serving radio network controller according to the radio link deactivation information.

The above-mentioned method can also comprise:

the serving radio network controller controlling a non-serving node B to perform activation of a non-serving enhanced dedicated channel radio link to the terminal according to the received radio link activation indication;

the serving radio network controller controlling the non-serving node B to perform deactivation of the non-serving enhanced dedicated channel radio link to the terminal according to the received radio link deactivation indication.

The above-mentioned method can also have the following features:

the step of the serving node B controlling the terminal to perform activation of the enhanced dedicated channel radio link can comprise: the serving node B controlling the terminal to perform activation of the enhanced dedicated channel radio link of an auxiliary carrier;

the step of the serving node B controlling the terminal to perform deactivation of the enhanced dedicated channel radio link can comprise: the serving node B controlling the terminal to perform deactivation of the enhanced dedicated channel radio link of the auxiliary carrier.

The above-mentioned method can also have the following features:

the drift radio network controller sends the radio link activation indication or the radio link deactivation indication to the serving radio network controller via a radio network subsystem application part layer of an interconnection of radio network controller interface.

The above-mentioned method can also have the following features:

the radio link activation indication carries a radio link set identification and/or a radio link identification to indicate that the radio link set and/or the radio link corresponding to the terminal has been activated;

the radio link deactivation indication carries the radio link set identification and/or the radio link identification to indicate that the radio link set and/or the radio link corresponding to the terminal has been deactivated.

The above-mentioned method can also have the following features:

the radio link activation indication further carries a marker of a direction to indicate that the radio link set and/or the radio link has been activated in the direction;

the marker of the direction is: a single uplink direction or a single downlink direction or a two-way direction.

The above-mentioned method can also have the following features:

the radio link deactivation indication further carries a marker of a direction to indicate that the radio link set and/or the radio link has been deactivated in the direction;

the marker of the direction is: a single uplink direction or a single downlink direction or a two-way direction.

The above-mentioned method can also have the following features:

the radio link activation indication further carries a time information of activation; and the time information is denoted with a connection frame number, and is a time point of the serving node B sending a radio link activation command to the terminal via an air interface, or is a time point of the terminal confirming of receiving a radio link activation command sent by the serving node B.

The above-mentioned method can also have the following features:

the radio link deactivation indication further carries a time information of deactivation; and the time information is denoted with a connection frame number, and is a time point of the serving node B sending a radio link deactivation command to the terminal via an air interface, or is a time point of the terminal confirming of receiving a radio link deactivation command sent by the serving node B.

In order to solve the above-mentioned technical problem, the present invention also provides an apparatus for communication control between radio network controllers, and the apparatus is applied to a drift radio network controller and comprises a reception module a transmission module, wherein, the reception module is configured to notify the transmission module after receiving a radio link activation information of a terminal sent by a serving node B belonging to the drift radio network controller; and notify the transmission module after receiving a radio link deactivation information of the terminal sent by the serving node B belonging to the drift radio network controller; and the transmission module is configured to send a radio link activation indication to a serving radio network controller according to the received radio link activation information; and, send a radio link deactivation indication to the serving radio network controller according to the received radio link deactivation information.

In summary, the present invention provides a method and apparatus for communication control between radio network controllers. In the present invention, the radio link activation or deactivation indication is sent to the serving radio network controller via the draft radio network controller to indicate the serving radio network controller that the radio link has been activated or deactivated, so as to solve the above-mentioned problem that the non-serving enhanced dedicated channel radio link under the non-serving node B of the terminal cannot be activated or deactivated and thus the dual-carrier technology cannot be available, in the scenario that the serving node B does not belong to a serving radio network controller but belongs to a drift radio network controller.

PREFERRED EMBODIMENTS OF THE PRESENT INVENTION

Figure 1:
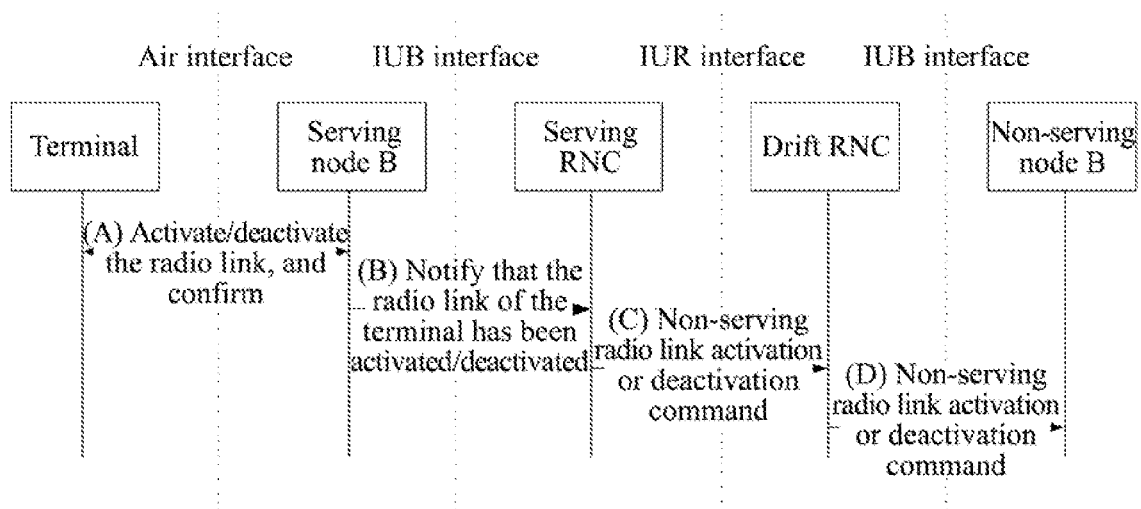
FIG. 1 is a schematic diagram of a process of activation and deactivation of an enhanced dedicated channel radio link when a serving node B belongs to a serving radio network controller in the prior art.
Figure 2:
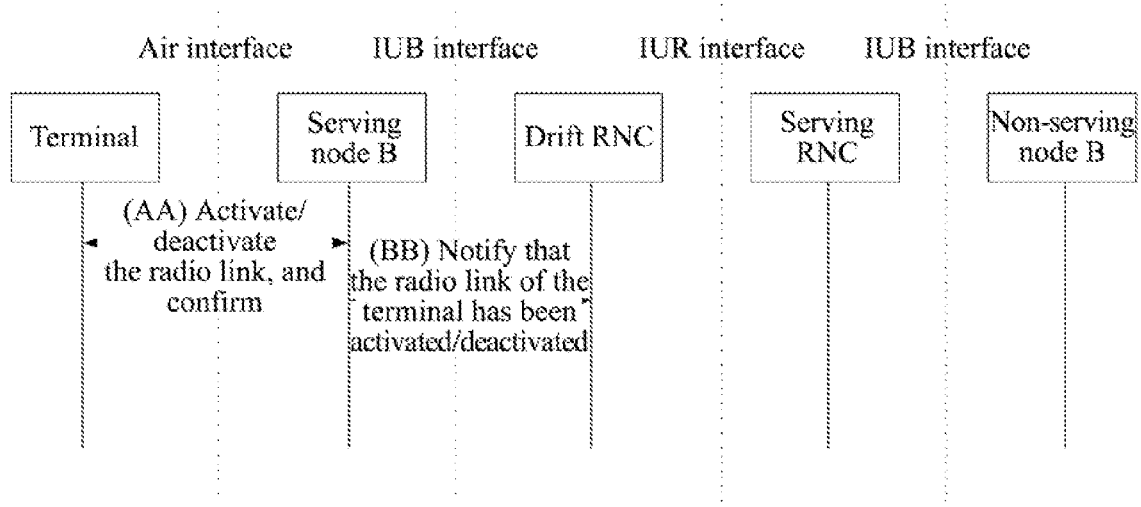
FIG. 2 is a schematic diagram of a serving node B performing a process of activation and deactivation of an enhanced dedicated channel radio link to a terminal when a serving node B belongs to a drift radio network controller in the prior art.

In the present invention, after a serving node B belonging to a drift radio network controller controls a terminal to perform activation of an enhanced dedicated channel radio link, the serving node B notifies a radio link activation information of the terminal to the drift radio network controller; and the drift radio network controller sends a radio link activation indication to a serving radio network controller according to the radio link activation information; and after the serving node B belonging to the drift radio network controller controls the terminal to perform deactivation of the enhanced dedicated channel radio link, the serving node B notifies a radio link deactivation information of the terminal to the drift radio network controller; and the drift radio network controller sends a radio link deactivation indication to the serving radio network controller according to the radio link deactivation information.

The radio link activation indication is used to indicate that a radio link set and/or a radio link of the terminal has been activated; and the radio link deactivation indication is used to indicate that a radio link set and/or a radio link of the terminal has been deactivated.

Thus, the serving radio network controller controls the non-serving node B to perform activation of a non-serving enhanced dedicated channel radio link to the terminal according to the received radio link activation indication; and the serving radio network controller controls the non-serving node B to perform deactivation of the non-serving enhanced dedicated channel radio link to the terminal according to the received radio link deactivation indication.

Wherein, the serving node B controlling the terminal to perform activation of the enhanced dedicated channel radio link specifically means that: the serving node B controls the terminal to perform activation of the enhanced dedicated channel radio link of an auxiliary carrier.

Wherein, the serving node B controlling the terminal to perform deactivation of the enhanced dedicated channel radio link specifically means that: the serving node B controls the terminal to perform deactivation of the enhanced dedicated channel radio link of the auxiliary carrier.

The drift radio network controller sends the radio link activation or deactivation indication to the serving radio network controller via a RNSAP layer of an IUR interface.

The radio link activation or deactivation indication carries a radio link set identification and/or a radio link identification to indicate the radio link set and/or the radio link corresponding to the terminal has been activated or deactivated; in other words, the indication object of the radio link activation or deactivation indication is the radio link set and/or the radio link. The radio link set is identified with the radio link set identification and the radio link is identified with the radio link identification. The indication object of the radio link activation or deactivation indication comprises at least serving radio link set and/or serving radio link.

The radio link activation or deactivation indication might carry a marker of a direction: "single uplink direction", "single downlink direction" or "two-way direction". When the marker of the direction is the "single uplink direction", it is indicated that the radio link set and/or the radio link has been activated or deactivated in the "single uplink direction". When the marker of the direction is the "single downlink direction", it is indicted that the radio link set and/or the radio link has been activated or deactivated in the "single downlink direction". When the marker of the direction is the "two-way direction", it is indicated that the radio link set and/or the radio link has been activated or deactivated in the "two-way direction" including both the uplink and downlink directions.

The radio link activation or deactivation indication might carry a time information of activation or deactivation. The time information is denoted with a connection frame number, and the time information can be a time point of the serving node B sending a radio link activation or deactivation command to the terminal via an air interface, or can be a time point of the terminal confirming of receiving a radio link activation or deactivation command sent by the serving node B.

In the following, the present invention will be described in detail in combination with the accompanying drawings and specific embodiments.

Figure 3:
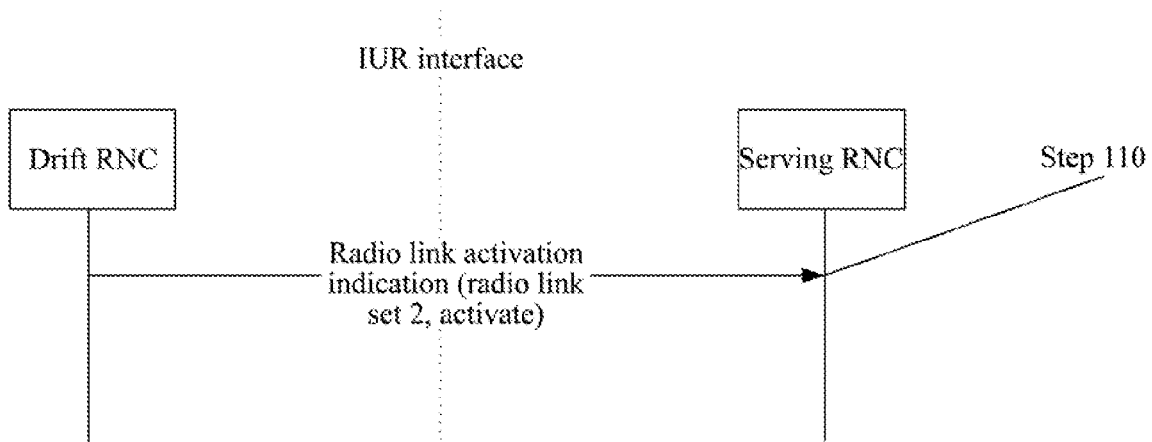
FIG. 3 is a schematic diagram of a specific implementation process in accordance with the first embodiment of the present invention.

The first embodiment is shown in FIG. 3.

Step 110: after the drift radio network controller receives the radio link activation information sent by the serving node B, the drift radio network controller sends the radio link activation indication to the serving radio network controller according to the radio link activation information.

Wherein: the radio link activation indication is sent via the RNSAP layer of the IUR interface.

Wherein: the indication object of the radio link activation indication is the radio link set identified with the radio link set identification 2.

Wherein: the radio link activation indication is used to indicate that the radio link set 2 has been activated.

Wherein, the drift radio network controller receives the radio link activation information sent by the serving node B, and collects them into one radio link set 2 in the present embodiment, and then sends the corresponding radio link activation indication to the serving radio network controller.

The process of notifying the radio link activation information of the terminal to the drift radio network controller after the serving node B controls the terminal to perform activation of the radio link is known in the prior art, thus this process is not repeated here.

Figure 4:
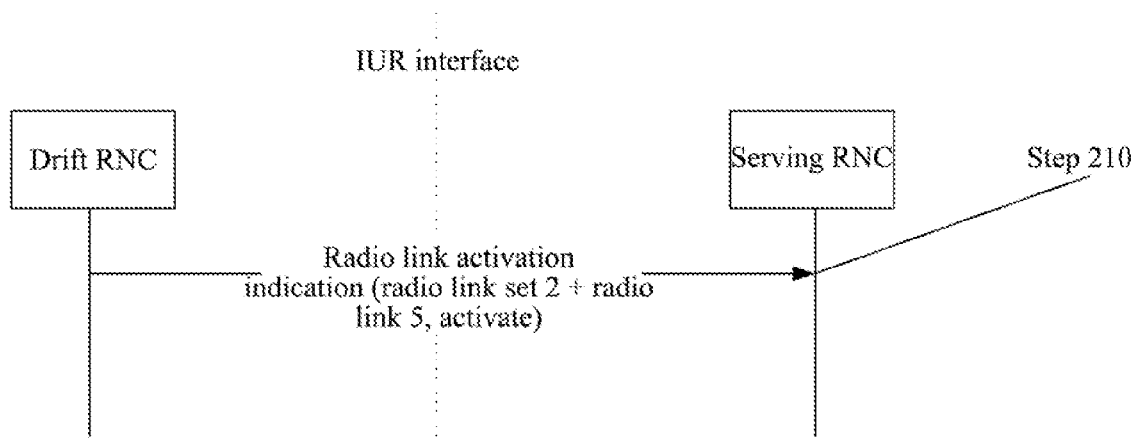
FIG. 4 is a schematic diagram of a specific implementation process in accordance with the second embodiment of the present invention.

The second embodiment is shown in FIG. 4.

Step 210: after the drift radio network controller receives the radio link activation information sent by the serving node B, the drift radio network controller sends the radio link activation indication to the serving radio network controller according to the radio link activation information.

Wherein: the radio link activation indication is sent via the RNSAP layer of the IUR interface.

Wherein: the indication object of the radio link activation indication is the radio link set and the radio link. The radio link set is identified with the radio link set identification 2. The radio link is identified with the radio link identification 5.

Wherein: the radio link activation indication is used to indicate that both the radio link set 2 and the radio link 5 have been activated.

Figure 5:
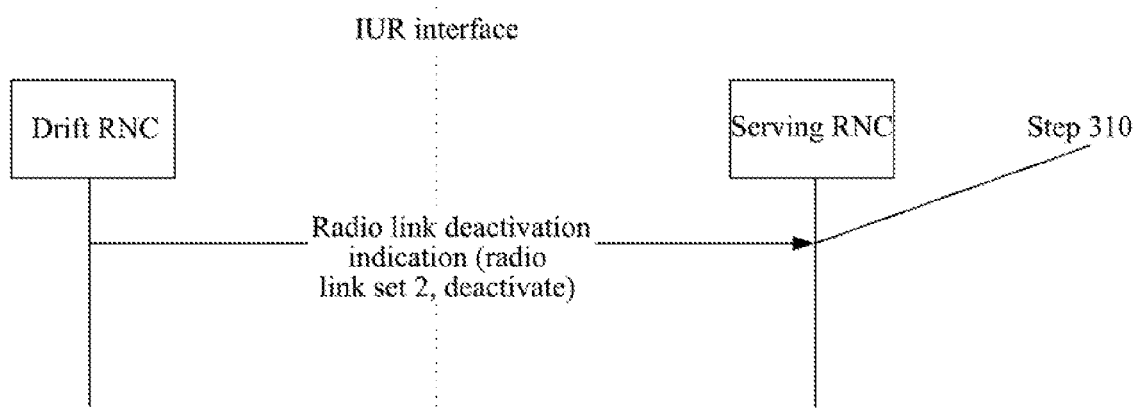
FIG. 5 is a schematic diagram of a specific implementation process in accordance with the third embodiment of the present invention.

The third embodiment is shown in FIG. 5.

Step 310: after the drift radio network controller receives the radio link deactivation information sent by the serving node B, the drift radio network controller sends a radio link deactivation indication to the serving radio network controller according to the radio link deactivation information.

Wherein: the radio link deactivation indication is sent via the RNSAP layer of the IUR interface.

Wherein: the indication object of the radio link deactivation indication is the radio link set identified with the radio link set identification 2.

Wherein, the radio link deactivation indication is used to indicate that the radio link set 2 has been deactivated.

The process of notifying the radio link deactivation information of the terminal to the drift radio network controller after the serving node B controls the terminal to perform deactivation of the radio link is known in the prior art, thus this process is not repeated here.

Figure 6:
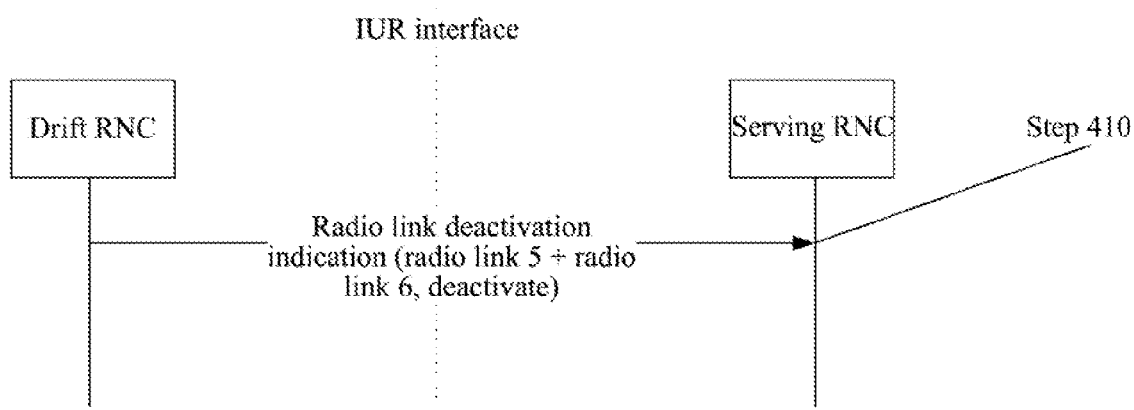
FIG. 6 is a schematic diagram of a specific implementation process in accordance with the fourth embodiment of the present invention.

The fourth embodiment is shown in FIG. 6.

Step 410: after the drift radio network controller receives the radio link deactivation information sent by the serving node B, the drift radio network controller sends the radio link deactivation indication to the serving radio network controller according to the radio link deactivation information.

Wherein: the radio link deactivation indication is sent via the RNSAP layer of the IUR interface.

Wherein: the indication object of the radio link deactivation indication is the radio links that are respectively identified with the radio link identification 5 and 6.

Wherein: the radio link deactivation indication is used to indicate that both the radio link 5 and the radio link 6 have been deactivated.

Figure 7:
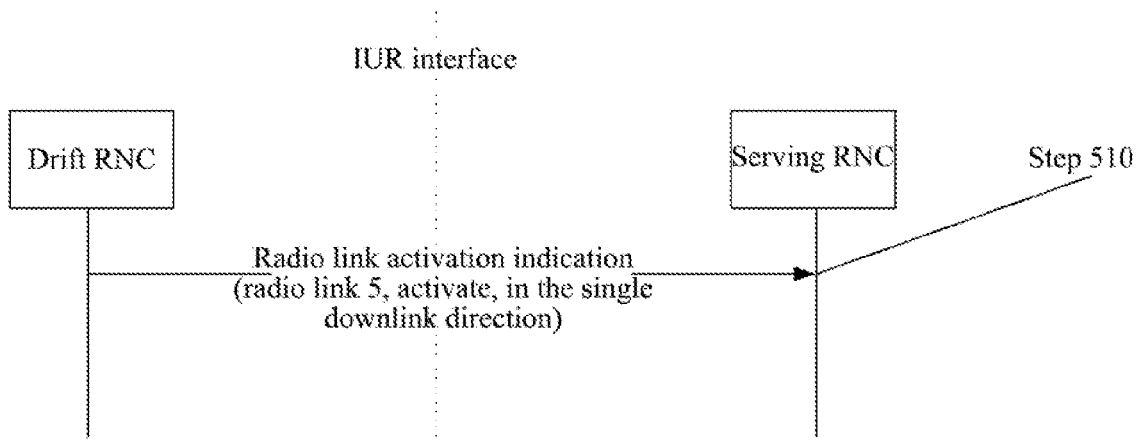
FIG. 7 is a schematic diagram of a specific implementation process in accordance with the fifth embodiment of the present invention.

The fifth embodiment is shown in FIG. 7.

Step 510: after the drift radio network controller receives the radio link activation information sent by the serving node B, the drift radio network controller sends the radio link activation indication to the serving radio network controller according to the radio link activation information.

Wherein: the radio link activation indication is sent via the RNSAP layer of the IUR interface.

Wherein: the indication object of the radio link activation indication is the radio link identified with the radio link identification 5.

Wherein: the radio link activation indication carries the marker of the direction "single downlink direction" used to indicate that the radio link 5 has been activated in the "single downlink direction".

Wherein: the radio link activation indication carries the time information of the activation. The time information is the time point at which the serving node B controls the terminal to perform the radio link activation or deactivation command of the auxiliary carrier via the air interface, and is denoted with the connection frame number, wherein the specific value of the connection frame number is 230 frame. The time point, used to indicate that the serving node B controls the terminal being at the 230 frame via the air interface, performs activation of the radio link 5 of the auxiliary carrier.

Figure 8:
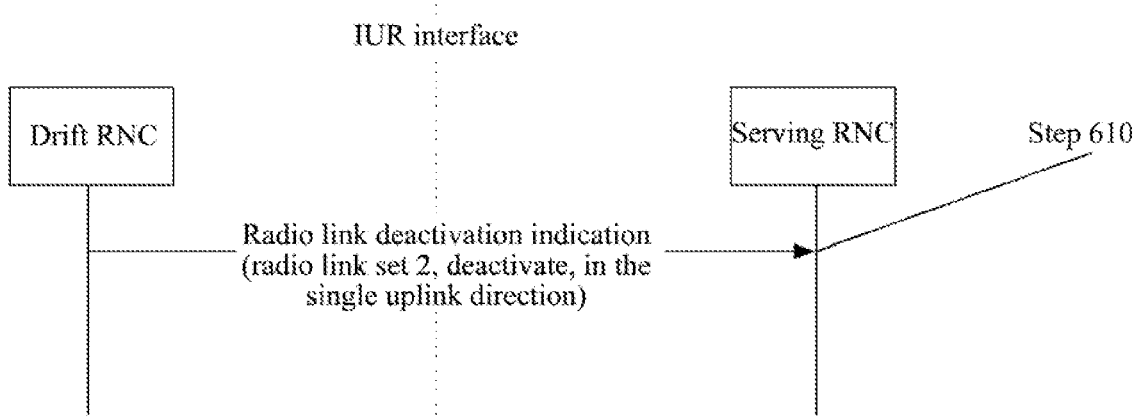
FIG. 8 is a schematic diagram of a specific implementation process in accordance with the sixth embodiment of the present invention.

The sixth embodiment is shown in FIG. 8.

Step 610: after the drift radio network controller receives the radio link deactivation information sent by the serving node B, the drift radio network controller sends the radio link deactivation indication to the serving radio network controller according to the radio link deactivation information.

Wherein: the radio link deactivation indication is sent via the RNSAP layer of the IUR interface.

Wherein: the indication object of the radio link deactivation indication is the radio link set identified with the radio link set identification 2.

Wherein: the radio link deactivation indication carries the marker of the direction "single uplink direction" used to indicate that the radio link set 2 has been deactivated in the "single uplink direction".

Wherein: the radio link deactivation indication carries the time information of the deactivation. The time information is the time point at which the terminal confirms of receiving the radio link activation or deactivation command of the auxiliary carrier sent by the serving node B, and is denoted with the connection frame number, wherein the specific value of the connection frame number is 200 frame. The time point used to indicate that the terminal is at the connection frame number of 200 frame, confirms of receiving the radio link set 2 deactivation command of the auxiliary carrier of the serving node B.

Figure 9:
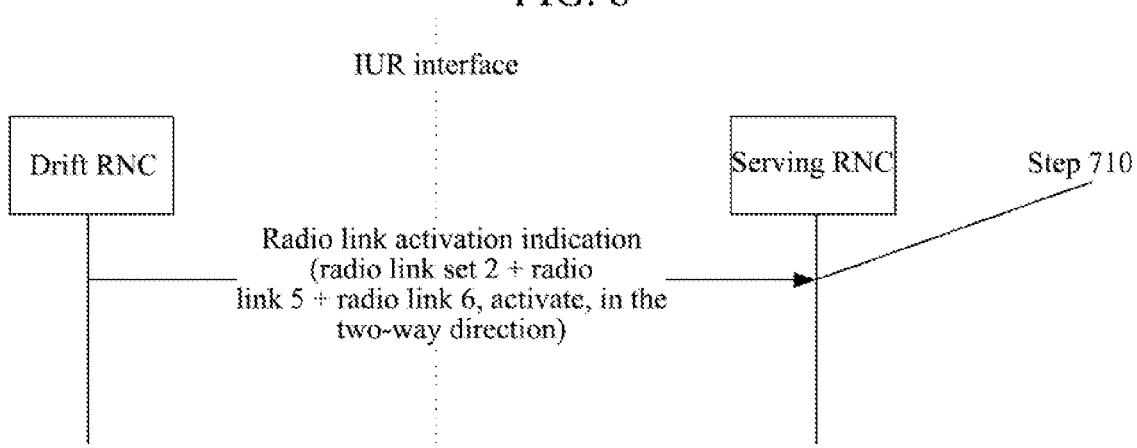
FIG. 9 is a schematic diagram of a specific implementation process in accordance with the seventh embodiment of the present invention.

The seventh embodiment is shown in FIG. 9.

Step 710: after the drift radio network controller receives the radio link activation information sent by the serving node B, the drift radio network controller sends the radio link activation indication to the serving radio network controller according to the radio link activation information.

Wherein: the radio link activation indication is sent via the RNSAP layer of the IUR interface.

Wherein: the indication object of the radio link activation indication is the radio link set and the radio links. The radio link set is identified with the radio link set identification 2. The radio links are identified with the radio link identification 5 and 6.

Wherein: the radio link activation indication carries the marker of the direction "two-way direction" used to indicate that the radio link set 2, the radio link 5 and the radio link 6 have been activated in the "two-way direction" including both the uplink and downlink directions.

Figure 10:
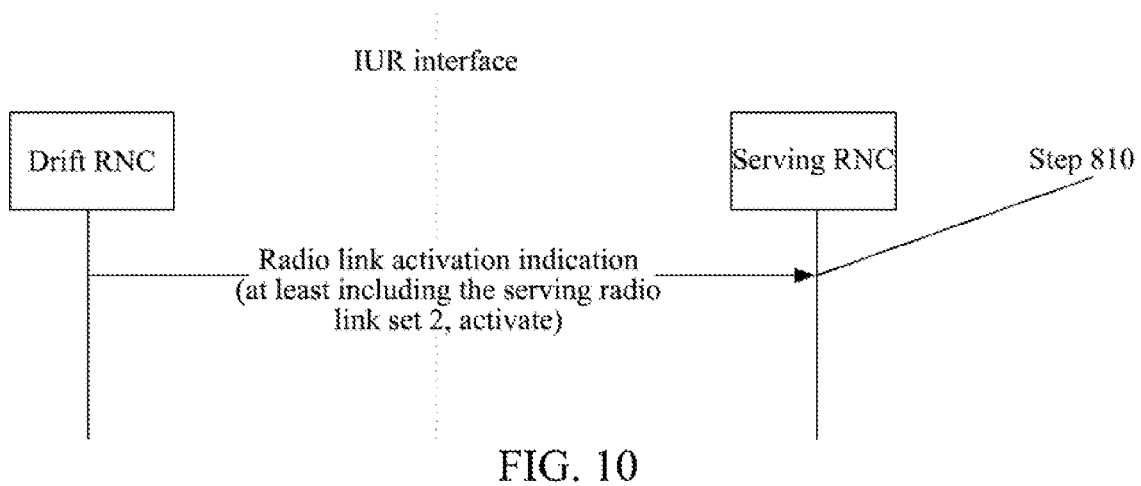
FIG. 10 is a schematic diagram of a specific implementation process in accordance with the eighth embodiment of the present invention.

The eighth embodiment is shown in FIG. 10.

Step 810: after the drift radio network controller receives the radio link activation information sent by the serving node B, the drift radio network controller sends the radio link activation indication to the serving radio network controller according to the radio link activation information.

Wherein: the radio link activation indication is sent via the RNSAP layer of the IUR interface.

Wherein: the drift radio network controller is a radio network controller to which the serving node B belongs.

Wherein: the indication object of the radio link activation indication contains at lest the serving radio link set 2.

Figure 11:
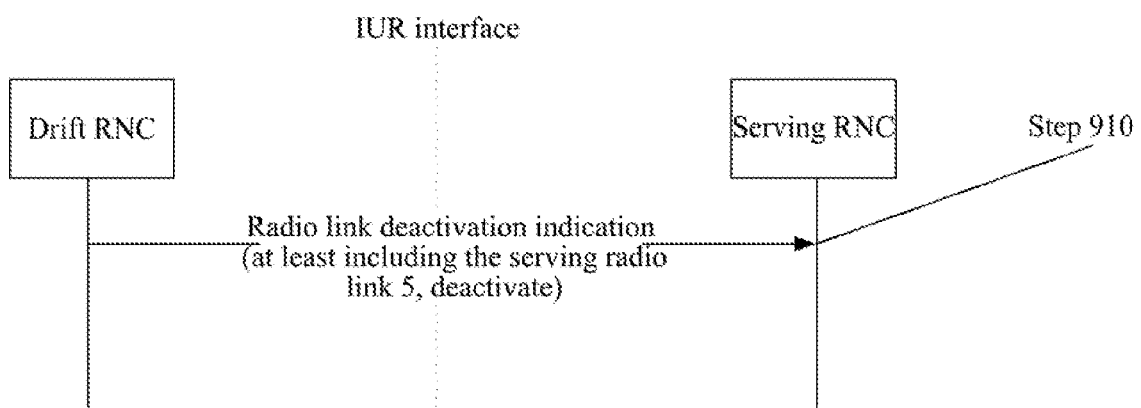
FIG. 11 is a schematic diagram of a specific implementation process in accordance with the ninth embodiment of the present invention.

The ninth embodiment is shown in FIG. 11.

Step 910: after the drift radio network controller receives the radio link deactivation information sent by the serving node B, the drift radio network controller sends the radio link deactivation indication to the serving radio network controller according to the radio link deactivation information.

Wherein: the radio link deactivation indication is sent via the RNSAP layer of the IUR interface.

Wherein: the drift radio network controller is a radio network controller to which the serving node B belongs.

Wherein: the indication object in the radio link deactivation indication contains at lest the serving radio link 5.

Figure 12:
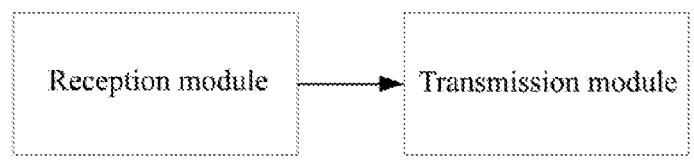
FIG. 12 is a schematic diagram of an apparatus in accordance with an embodiment of the present invention.

As shown in FIG. 12, the apparatus for communication control between the radio network controllers in accordance with an embodiment of the present invention is applied in the drift radio network controller and comprises a reception module and a transmission module that are connected with each other.

The reception module is configured to notify the transmission module after receiving a radio link activation information of a terminal sent by a serving node B belonging to the drift radio network controller; and notify the transmission module after receiving a radio link deactivation information of the terminal sent by the serving node B belonging to the drift radio network controller.

The transmission module is configured to send a radio link activation indication to a serving radio network controller according to the received radio link activation information; and, send a radio link deactivation indication to the serving radio network controller according to the received radio link deactivation information.

Of course, the present invention can also have a variety of other embodiments, and for those skilled in the art, a variety of modifications and variations can be made according to the present invention, without departing from the spirit and essence of the present invention. However, all these types of modifications and variations should belong to the scope of the appending claims of the present invention.

Industrial Applicability

Compared to the prior art, the present invention solves the problem that the non-serving enhanced dedicated channel radio link under the non-serving node B of the terminal cannot be activated or deactivated and thus the dual-carrier technology cannot be available, in the scenario that the serving node B does not belong to a serving radio network controller but belongs to a drift radio network controller.

What is claimed is:

1. A method for communication control between radio network controllers, comprising:
   after a serving node B belonging to a drift radio network controller controls a terminal activating an enhanced dedicated channel radio link, said serving node B notifying the radio link activation information to the drift radio network controller; and after the drift radio network controller receives the radio link activation information of the terminal from the serving node B, the drift radio network controller sending a radio link activation indication to a serving radio network controller according to the radio link activation information; and
   after the serving node B belonging to the drift radio network controller controls the terminal deactivating the enhanced dedicated channel radio link, said serving node B notifying the radio link deactivation information of the terminal to the drift radio network controller; and after the drift radio network controller receives the radio link deactivation information of the terminal from the serving node B, the drift radio network controller sending a radio link deactivation indication to the serving radio network controller according to the radio link deactivation information;
   wherein, the serving node B only belongs to the drift radio network controller, but does not belong to the serving radio network controller;
   the radio link activation indication carries a radio link set identification and/or a radio link identification to indicate that the radio link set and/or the radio link corresponding to the terminal has been activated;
   the radio link deactivation indication carries the radio link set identification and/or the radio link identification to indicate that the radio link set and/or the radio link corresponding to the terminal has been deactivated;
   wherein, the radio link activation indication further carries a time information of activation, the time information is denoted with a connection frame number, and is a time point of the serving node B sending a radio link activation command to the terminal via an air interface, or is a time point of the terminal confirming of receiving a radio link activation command sent by the serving node B; or, the radio link deactivation indication further carries a time information of deactivation, the time information is denoted with a connection frame number, and is a time point of the serving node B sending a radio link deactivation command to the terminal via an air interface, or is a time point of the terminal confirming of receiving a radio link deactivation command sent by the serving node B.

2. The method of claim 1, wherein, further comprising:
   the serving radio network controller controlling a non-serving node B to perform activation of a non-serving enhanced dedicated channel radio link of the terminal according to the received radio link activation indication; and
   the serving radio network controller controlling the non-serving node B to perform deactivation of the non-serving enhanced dedicated channel radio link of the terminal according to the received radio link deactivation indication.

3. The method of claim 1, wherein,
   the step of the serving node B controlling the terminal to perform activation of the enhanced dedicated channel radio link comprises: the serving node B controlling the terminal to perform activation of the enhanced dedicated channel radio link of an auxiliary carrier;
   the step of the serving node B controlling the terminal to perform deactivation of the enhanced dedicated channel radio link comprises: the serving node B controlling the terminal to perform deactivation of the enhanced dedicated channel radio link of the auxiliary carrier.

4. The method of claim 1, wherein,
   in the step of the drift radio network controller sending the radio link activation indication or the radio link deactivation indication to the serving radio network controller, the drift radio network controller sends the radio link activation indication or the radio link deactivation indication to the serving radio network controller via a radio network subsystem application part layer of an interconnection of radio network controller interface.

5. The method of claim 1, wherein,
   the radio link activation indication further carries a marker of a direction to indicate that the radio link set and/or the radio link has been activated in the direction;
   the marker of the direction is: a single uplink direction or a single downlink direction or a two-way direction.

6. The method of claim 1, wherein,
   the radio link deactivation indication further carries a marker of a direction to indicate that the radio link set and/or the radio link has been deactivated in the direction;
   the marker of the direction is: a single uplink direction or a single downlink direction or a two-way direction.

7. An apparatus to be applied to a drift radio network controller for communication control between radio network controllers comprising:
   a reception module and a transmission module, wherein, the reception module is configured to notify the transmission module the radio link activation information after receiving a radio link activation information of a terminal sent by a serving node B belonging to the drift radio network controller; and the transmission module is configured to, in response to the notification from the reception module, send a radio link activation indication to a serving radio network controller according to the received radio link activation information; and the reception module is configured to notify the transmission module the radio link deactivation information after receiving a radio link deactivation information of the terminal sent by the serving node B belonging to the drift radio network controller; and the transmission module is configured to, in response to the notification from the reception module, send a radio link deactivation indication to the serving radio network controller according to the received radio link deactivation information;

wherein, the serving node B only belongs to the drift radio network controller, but does not belong to the serving radio network controller;

the radio link activation indication carries a radio link set identification and/or a radio link identification to indicate that the radio link set and/or the radio link corresponding to the terminal has been activated;

the radio link deactivation indication carries the radio link set identification and/or the radio link identification to indicate that the radio link set and/or the radio link corresponding to the terminal has been deactivated;

wherein, the radio link activation indication further carries a time information of activation, the time information is denoted with a connection frame number, and is a time point of the serving node B sending a radio link activation command to the terminal via an air interface, or is a time point of the terminal confirming of receiving a radio link activation command sent by the serving node B; or, the radio link deactivation indication further carries a time information of deactivation, the time information is denoted with a connection frame number, and is a time point of the serving node B sending a radio link deactivation command to the terminal via an air interface, or is a time point of the terminal confirming of receiving a radio link deactivation command sent by the serving node B.

8. The method of claim 2, wherein, the step of the serving node B controlling the terminal to perform activation of the enhanced dedicated channel radio link comprises: the serving node B controlling the terminal to perform activation of the enhanced dedicated channel radio link of an auxiliary carrier;

the step of the serving node B controlling the terminal to perform deactivation of the enhanced dedicated channel radio link comprises: the serving node B controlling the terminal to perform deactivation of the enhanced dedicated channel radio link of the auxiliary carrier.

9. The method of claim 2, wherein, in the step of the drift radio network controller sending the radio link activation indication or the radio link deactivation indication to the serving radio network controller, the drift radio network controller sends the radio link activation indication or the radio link deactivation indication to the serving radio network controller via a radio network subsystem application part layer of an interconnection of radio network controller interface.

10. The method of claim 2, wherein, the radio link activation indication further carries a marker of a direction to indicate that the radio link set and/or the radio link has been activated in the direction;

the marker of the direction is: a single uplink direction or a single downlink direction or a two-way direction.

11. The method of claim 2, wherein, the radio link deactivation indication further carries a marker of a direction to indicate that the radio link set and/or the radio link has been deactivated in the direction;

the marker of the direction is: a single uplink direction or a single downlink direction or a two-way direction.

* * * * *